(12) United States Patent
Shaath

(10) Patent No.: US 10,296,563 B2
(45) Date of Patent: May 21, 2019

(54) AUTOMATED TESTING OF PERCEPTIBLE WEB PAGE ELEMENTS

(71) Applicant: salesforce.com, inc., San Francisco, CA (US)

(72) Inventor: Hilal Shaath, Bothell, WA (US)

(73) Assignee: salesforce.com, inc., San Francisco, CA (US)

( * ) Notice: Subject to any disclaimer, the term of this patent is extended or adjusted under 35 U.S.C. 154(b) by 229 days.

(21) Appl. No.: 15/149,953

(22) Filed: May 9, 2016

(65) Prior Publication Data

US 2017/0324803 A1  Nov. 9, 2017

(51) Int. Cl.
| H04L 29/08 | (2006.01) |
| G06F 17/22 | (2006.01) |
| G06F 11/36 | (2006.01) |

(52) U.S. Cl.
CPC .......... *G06F 17/2247* (2013.01); *G06F 11/36* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

OTHER PUBLICATIONS

Internet accesable link >> https://www.ncbi.nlm.nih.gov/pmc/articles/PMC4029974/ <<.*

(Continued)

*Primary Examiner* — Tung S Lau
(74) *Attorney, Agent, or Firm* — Lorenz & Kopf, LLP

(57) ABSTRACT

Methods and systems are provided for testing graphical elements within a graphical user interface associated with a computer file, such as a web page. One exemplary method involves a computing device coupled to a communications network identifying a visible subset of graphical elements within a graphical user interface associated with a computer file available over the network and identifying a testable subset of the visible subset. To identify the testable subset the computing device obtains spatial display properties for each graphical element of the visible subset, performs a hit test for the respective graphical element using the spatial display properties, and retains the respective graphical element in the testable subset based on a result of the hit test corresponding to the respective graphical element. The testable subset thereby includes graphical elements that are perceptible to human users, and conversely, excludes imperceptible graphical elements.

16 Claims, 5 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0198858 A1* | 12/2002 | Stanley ............. G06F 16/20 706/50 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0173840 A1* | 8/2006 | Shaath ............. G06F 9/454 |
| 2006/0203848 A1* | 9/2006 | Damphier ............. H04L 69/03 370/469 |
| 2006/0275794 A1* | 12/2006 | Carrino ............. C12Q 1/6876 435/6.18 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0095864 A1* | 4/2013 | Marovets ............. H04W 4/14 455/466 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0067520 A1* | 3/2015 | Kovacs ............. G06Q 10/10 715/733 |

OTHER PUBLICATIONS

Gustavo A Salazar, A web-based protein interaction network Visualizer, Salazar et al. BMC Bioinformatics 2014, 15:129, 8 pages.*

(56) References Cited

OTHER PUBLICATIONS

Daniel Kraus, Machine Learning and Evolutionary Computing for GUI-based Regression Testing, Feb. 11, 2018, 125 pages.*

* cited by examiner

AUTOMATED TESTING OF PERCEPTIBLE WEB PAGE ELEMENTS

TECHNICAL FIELD

Embodiments of the subject matter described herein relate generally to computer systems, and more particularly, to methods and systems for identifying and testing web page elements.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

It is desirable to test new applications or web pages to be integrated therein prior to deployment to identify any potential problems in advance. However, as the complexity of web pages increases, the complexity of testing also increases. As a result, testing may fail to accurately emulate human users or require an excessive amount of time and resources when testing web page elements exhaustively. Accordingly, what is needed is an efficient means for testing web pages and related virtual applications in a manner that actually emulates human users.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
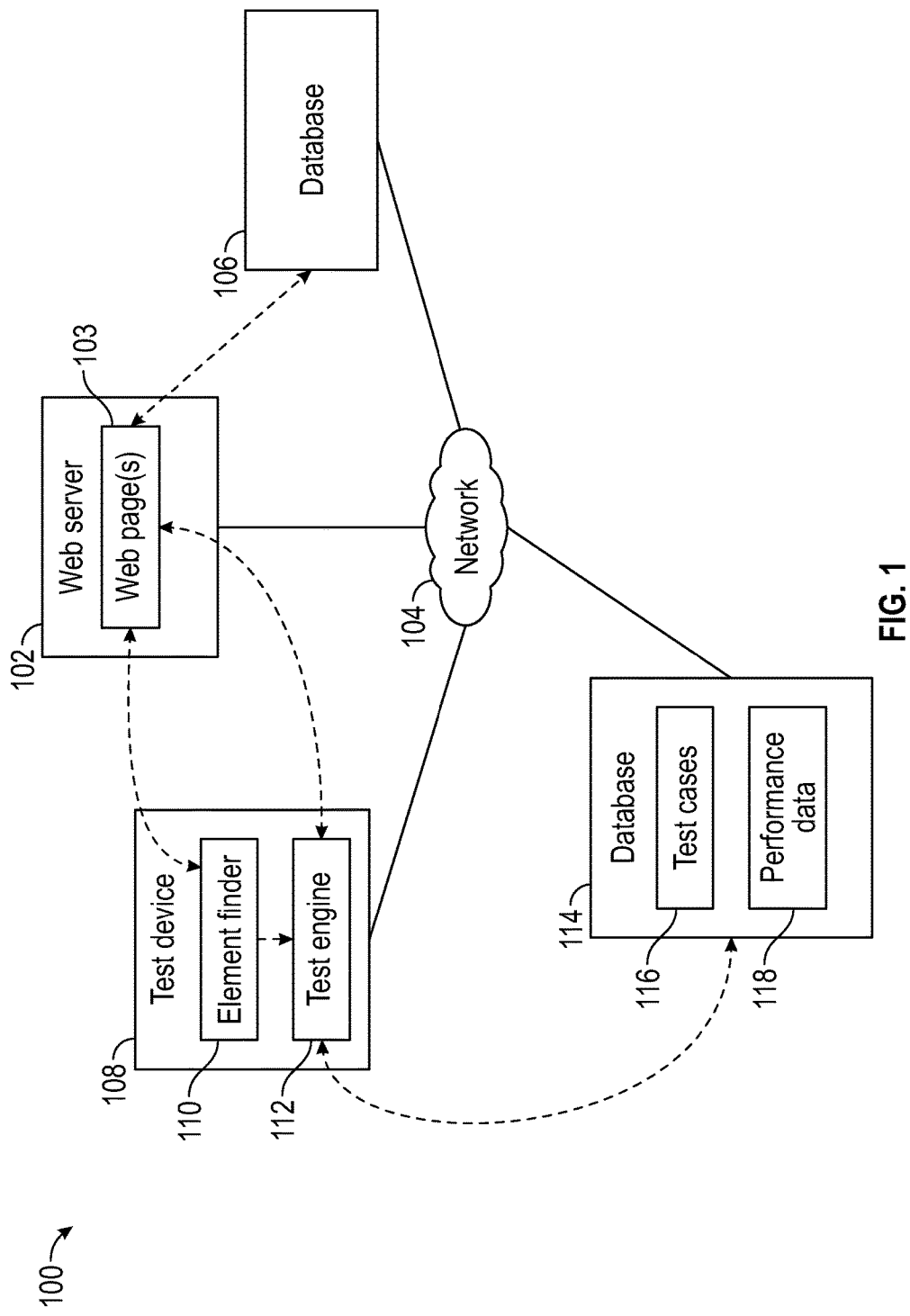
FIG. 1 is a block diagram of an exemplary system for testing graphical elements associated with a computer file.

Embodiments of the subject matter described herein generally relate to methods and systems for identifying elements on a display device that are actually perceptible to a human user and performing automated testing on those elements in a manner that emulates or replicates human behavior. It should be noted that although one or more embodiments may be described herein in the context of identifying elements within a web page, and more particularly, a web page integrated in a virtual application in an on-demand multi-tenant database system, the subject matter is not necessarily so limited, and in practice, may be implemented in an equivalent manner in any number of different database systems, cloud computing systems, and the like, and in the context of any type of document, computer file or other resource that includes, presents, or otherwise displays elements that are actionable by a human user.

In exemplary embodiments described herein, a plurality of visible elements are initially identified within a computer file, such as a HyperText Markup Language (HTML) file corresponding to a web page. In this regard, a visible element is a graphical user interface (GUI) element encoded or otherwise embedded within the computer file and generated the computer file being accessed, loaded, or otherwise referenced during execution of a computer program or service. Depending on the embodiment, the visible element is either designated (or encoded) as visible within the code of the computer file, or alternatively, the visible element not designated (or encoded) as hidden or invisible within the code of the computer file. That said, a visible element may not actually be visible or perceptible to a human user, either due to the visible element being located outside of the displayed area or behind one or more other elements, objects, or layers within the displayed area.

To identify or otherwise determine which visible elements are actually perceptible to human users, spatial display properties are obtained for each respective visible element. To determine a respective visible element is perceptible, a hit test is performed using the spatial display properties to identify what (if any) element is returned for a location on the GUI display where the visible element should reside based on its location, dimensions, and orientation. For example, using the location, dimensions, and orientation associated with a visible element, a test location corresponding to the middle (or midpoint) of the visible element may be determined and provided as an input parameter to the hit test. When the result of the hit test corresponds to that visible element being analyzed, the visible element is designated or otherwise classified as a testable element, that is, an element that is actually perceptible to and capable of being manipulated or activated by a human user, and therefore, should be tested. In this manner, visible elements within a web page or other computer file are effectively filtered using the hit test to obtain a subset of the visible elements that are actually perceptible and manipulable by end users. Using that subset of testable elements, the functionality of a web page (or any other GUI display associated with a computer file) may be tested efficiently and in a manner that more accurately emulates or replicates human end users, as compared to exhaustive automated testing which implicates elements that are not actually perceptible and manipulable, which undesirably consumes unnecessary resources and produces inaccurate results that do not reflect the likely performance of the web page in response to human interaction.

FIG. 1 depicts an exemplary embodiment of a system 100 for identifying and testing perceptible elements within a GUI display associated with a computer file. For purposes of explanation, the system 100 is described herein in the context of the computer file corresponding to a web page that may be presented in a web browser or similar client application executing on a client computing device, which can be realized as any sort of personal computer, mobile telephone, tablet or other network-enabled electronic device that includes a display device, such as a monitor, screen, or another conventional electronic display, capable of graphically presenting a user interface (UI) associated with the computer file along with a user input device, such as a keyboard, a mouse, a touchscreen, or the like, capable of receiving input a human user of the client device to manipulate, actuate, activate, or otherwise interface with one or more elements presented within the GUI.

In the illustrated embodiment, a server computing system 102 stores, generates, or otherwise obtains one or more computer data file(s) corresponding to one or more web page(s) 103 and publishes or otherwise provides the computer data file(s) (or portions thereof) to any number of potential client computing devices via a communications network 104, such as a wired and/or wireless computer network, a cellular network, a mobile broadband network, a radio network, or the like. In one or more embodiments, the server computing device 102 generates the web page(s) 103 as part of an instance of a virtual application generated at run-time (or "on-demand") based at least in part on data stored or otherwise maintained by a database 106 that is communicatively coupled to the server 102 via the communications network 104. In this regard, in some embodiments, the server computing 102 and the database 106 cooperatively provide a cloud computing platform (or framework), as described in greater detail below in the context of FIG. 5. In such embodiments, the database 106 can be realized as a multi-tenant database that is shared between multiple tenants, with each tenant having its own set of associated users, its own associated data that is logically separate or otherwise isolated from data belonging to other tenants, and its own associated application code segments that may be integrated with the virtual application platform code to generate web pages and related content that provide a customized tenant-specific user experience for users associated with that tenant. That said, it should be appreciated that the subject matter is not intended to be limited to use with virtual applications, multi-tenant database systems, on-demand computing environments, and/or the like.

Still referring to FIG. 1, the server computing system 102 generally represents a combination of processing logic, circuitry, hardware, and/or other components configured to support hosting and delivery of web pages or other computer files or resources and the related processes, tasks, operations, and/or functions described herein. In this regard, the server computing system 102 (alternatively referred to herein as a web server) includes at least a processing system, which may be implemented using any suitable processing system and/or device, such as, for example, one or more processors, central processing units (CPUs), controllers, microprocessors, microcontrollers, processing cores and/or other hardware computing resources configured to support the operations described herein. The processing system may also include or otherwise access a data storage element (or memory) capable of storing programming instructions for execution by the processing system, that, when read and executed, cause processing system to perform various processes, tasks, operations, and/or functions that support the subject matter described herein. The memory may be realized as any sort of random access memory (RAM), read only memory (ROM), flash memory, magnetic or optical mass storage, or any other suitable non-transitory short or long term data storage or other computer-readable media, and/or any suitable combination thereof.

As described in greater detail below in the context of FIG. 2, the illustrated system includes a client device 108 (alternatively referred to herein as a testing device) which is configured to identify visually perceptible manipulable elements within the GUI display associated with the web page published by or otherwise retrieved from the web server 102 and classify or otherwise designate those elements as testable elements for purposes of testing the functionality of the web page. The testing device 108 can be realized as any sort of computer, electronic device, or other network-enabled computing device capable of performing the processes, tasks, operations, and/or functions described herein. In this regard, similar to the web server 102, the testing device 108 also includes a processing system and a data storage element capable of storing programming instructions for execution by the processing system, that, when read and executed, cause the processing system of the testing device 108 to perform various processes, tasks, operations, and/or functions that support the subject matter described herein. In the illustrated embodiment, the instructions, when read and executed by the processing system, cause the testing device 108 to generate or otherwise support an element finder 110 and a test engine 112.

The element finder 110 generally represents the component of the testing device 108 that detects or otherwise identifies manipulable elements within the web page(s) 103 available from the web server 102 and then discerns or otherwise determines which of those elements are visually perceptible, and therefore, testable. The test engine 112 generally represents the component of the testing device 108 that receives or otherwise obtains identification of the subset of elements within the web page(s) 103 detected or otherwise identified as being testable by the element finder 110 and then tests or otherwise analyzes the functionality of the web page(s) 103 using the testable elements. In one or more embodiments, the test engine 112 accesses a testing database 114 via the network 104 to receive or otherwise obtain one or more test cases 116, generates or otherwise constructs corresponding tests to be performed based on the test cases 116 and the testable elements, and then implements, performs, or otherwise executes the tests to interact with the testable elements of the web page(s) 103 in a manner that attempts to emulate or replicate human user behavior. For example, the test cases may define verification, validation, or other functional or performance tests for performance on testable elements of an identified type. In other embodiments, the test engine 112 may dynamically generate or otherwise create stress tests based on the testable elements identified by the element finder 110, as described in greater detail below. The test engine 112 also measures, tracks, or otherwise monitors performance of the tests and calculates or otherwise determines one or more performance metrics associated with the respective web page 103 and the respective test case 116, and then stores or otherwise maintains the determined performance data 118 associated with the testing in the testing database 114.

Figure 2:
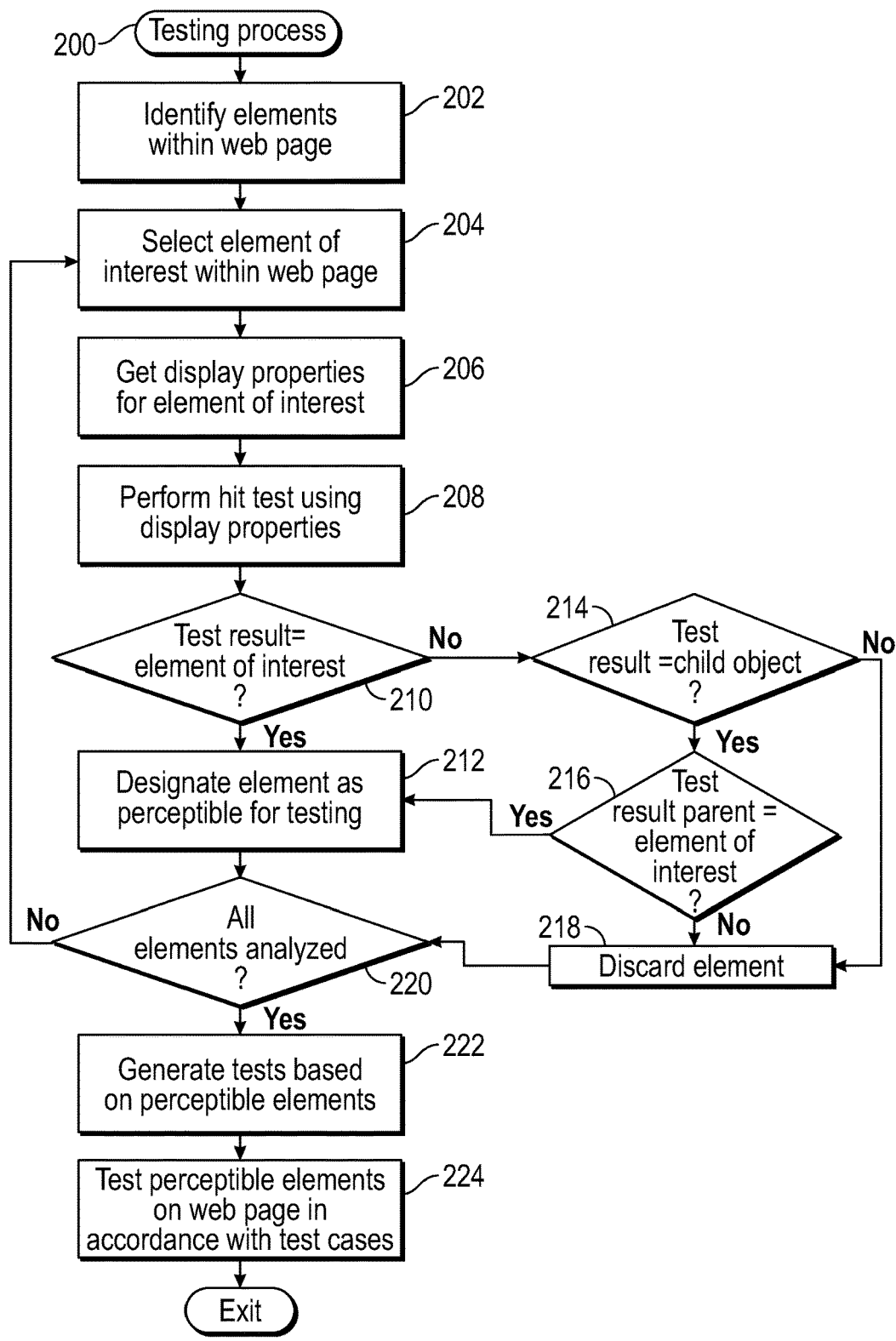
FIG. 2 is a flow diagram of an exemplary testing process suitable for implementation by a testing device in the system of FIG. 1 in accordance with one or more embodiments.

FIG. 2 depicts an exemplary embodiment of a testing process 200 suitable for implementation by a testing device to test human-perceptible elements in a GUI display associated with a computer data file. For example, the testing process 200 may be performed by the testing device 108 to test perceptible elements within a web page 103 available from the web server 102. For illustrative purposes, the following description may refer to elements mentioned above in connection with FIG. 1. In practice, portions of the testing process 200 may be performed by different elements of the system 100; however, for purposes of explanation, the subject matter is described herein primarily in the context of the testing process 200 being performed by the testing device 108 (e.g., the element finder 110 and the test engine 112). It should be appreciated that the testing process 200 may include any number of additional or alternative tasks, the tasks need not be performed in the illustrated order and/or the tasks may be performed concurrently, and/or the testing process 200 may be incorporated into a more comprehensive procedure or process having additional functionality not described in detail herein. Moreover, one or more of the tasks shown and described in the context of FIG. 2 could be omitted from a practical embodiment of the testing process 200 as long as the intended overall functionality remains intact.

The testing process 200 begins by identifying an initial set of elements associated with the web page for analysis (task 202). In exemplary embodiments, the initial set of elements includes all elements within the web page having a particular attribute value. For example, the initial set of elements may include all web page GUI elements having a visibility attribute value equal to true. In some embodiments, the initial set of elements may be further qualified by element type or some other attribute. In this regard, the initial set of elements may be further limited or filtered, so that it includes only elements that are designated as visible while also being manipulable or actionable, or only those visible elements having nonzero dimensions. For example, in one embodiment, all visible uniform resource locators (URLs) within a web page may be identified by searching the web page file for all anchor elements contained therein having a visibility value equal to true (e.g., (jquery("a:visible")), where (jquery ("a:visible").length) returns the number of visible anchor elements of the array returned by jquery, which may be greater than the number of actually perceptible elements). The result of the element finder 110 searching the web page 103 for visible elements of a particular type is an initial filtered list of the those visible elements within the web page 103.

The testing process 200 incrementally selects elements from the list, and for each selected element having the desired attribute values that is identified within the web page, the testing process 200 verifies or confirms that the selected element is perceptible to a human user, and either designates the element as testable or discards the element from further testing. For each element of the initial set, the testing process 200 obtains, determines, or otherwise identifies the spatial display properties for the selected element on the GUI display and performs a hit test for the selected element using the spatial display properties (tasks 204, 206, 208). When the testing process 200 determines the result of the hit test corresponds to the selected element, then the testing process 200 designates or otherwise classifies the selected element as a testable element that is perceptible to human users (task 212). When the result of the hit test corresponds to a different element, then the testing process 200 determines whether the hit test result is a child object, and if so, the testing process 200 determines whether the parent of the hit test result corresponds to the selected element (tasks 214, 216). In this regard, when the parent of the hit test result corresponds to the selected element, then the testing process 200 designates or otherwise classifies the selected element as a testable element that is perceptible to human users even though the hit test did not return the element (task 212). Conversely, when the hit test result does not correspond to the selected element or a child thereof, the testing process 200 discards or otherwise removes the selected element from the initial set of elements identified within the web page (task 218), thereby excluding that element from further testing. The testing process 200 repeats the loop defined by tasks 204, 206, 208, 210, 212, 214, 216, 218 and 220 until all elements from the initial set identified at task 202 have been analyzed and either discarded or classified as testable.

For example, for a first visible anchor element in an initial set of all visible anchor elements associated with a web page, the element finder 110 obtains spatial display properties for that visible anchor element, such as the location or position of the anchor element on the GUI display (e.g., xy-coordinates) and the dimensions of the anchor element (e.g., length and width). In this regard, the spatial display properties may be retrieved from the web page computer file as attributes encoded in association with that anchor element within the web page. In an exemplary embodiment, the element finder 110 uses the combination of element location and dimensions to calculate or otherwise determine a testing location on the GUI display that overlaps a portion of the element, such as, for example, the xy-coordinate location within the GUI display corresponding to the geometric center (or midpoint) of the element based on its location and dimensions. In this regard, the testing location input to the hit test may be offset from the xy-coordinate location or position associated with element by an amount equal to half of the length and/or width of the element. Some embodiments may utilize a plurality of testing locations for a given element, for example, to incrementally scan and test across or along the boundaries or body of the element to account for the possibility that the element is partially overlapped while at least a portion of the element remains perceptible.

Once a testing location overlapping the selected element is identified, a hit test is performed using that testing location to determine whether the detected element from the hit test corresponds to the selected element. In this regard, the hit test determines whether activation of a user input device at that testing location will intersect, manipulate, or otherwise activate the selected element. For example, the element finder 110 may issue an elementFromPoint application programming interface (API) call on the web page file with input coordinates corresponding to the testing location, e.g., document.elementFromPoint ($x_t$, $y_t$), where $x_t$, represents the x-coordinate of the testing location, $y_t$ represents the y-coordinate of the testing location, and document represents the URL of the web page 103 to be tested on the web server 102. When the result of the hit test equals the selected element, the element finder 110 classifies the selected element as perceptible and testable. When the result of the hit test does not equal the selected element, the element finder 110 checks to see whether the element returned by the hit test is a child object by stepping backwards through the document object model (DOM) tree for the web page. For example, when the child attribute of the hit test result element is equal to true, the element finder 110 identifies or otherwise determines the parent element of the hit test result element, and when the parent of the hit test result element matches the selected element being analyzed, the element finder 110 classifies the selected element as perceptible and testable. Otherwise, the element finder 110 discards the selected element from further testing and analysis. In this regard, when the hit test returns a null result, the element finder 110 also discards the selected element from further testing and analysis because the selected element is deemed to be outside of the display area of the GUI display. In this manner, elements that are not perceptible to a human user without scrolling or manipulating the display area of the GUI display may also be excluded from testing.

The element finder 110 performs the hit test analysis for each element in the initial set, until all elements have been analyzed. In this manner, the element finder 110 may classify, designate, select, or otherwise identify the perceptible elements that are selectable or manipulable by a human user while excluding elements from the initial set that are not readily selectable or manipulable by a human user upon loading the web page. For example, all URLs or hyperlinks within a web page that are actually perceptible and selectable by a human user upon loading the web page without any scrolling may be identified by analyzing all visible anchor elements within the web page and excluding from further testing any of those anchor elements designated as visible that are either outside of the initial display area of the GUI display or overlapped by other elements or layers.

Figure 3:
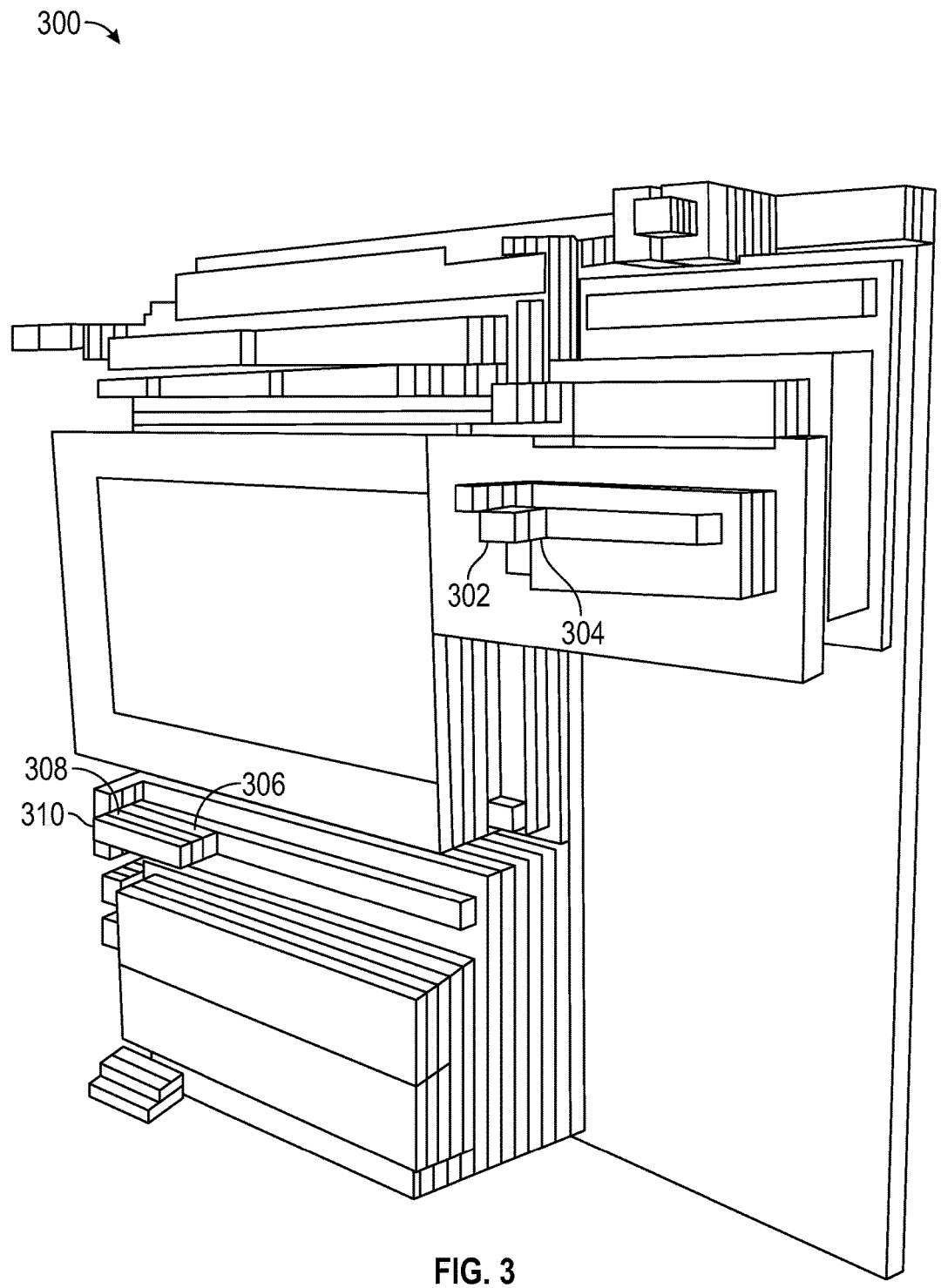
FIG. 3 is a schematic view of a web page suitable for testing in conjunction with the testing process of FIG. 2 in the system of FIG. 1 in accordance with one or more exemplary embodiments.

FIG. 3 depicts a document or resource, such as a web page 300, that illustrates layering or cascading stylization that results in imperceptible visible elements. For example, a visible graphical user interface element 304 that is overlapped by or otherwise underlies another visible graphical user interface element 302 is imperceptible to a human user viewing the web page 300, and therefore, when element 304 is not a parent of element 302, element 304 is discarded or otherwise excluded from subsequent testing because performing a hit test using the spatial display properties of the overlapped element 304 returns element 302 (e.g., tasks 216, 218). Conversely, element 302 is designated as perceptible and included in future testing when performing a hit test using the spatial display properties of element 302 returns element 302. As another example, a visible anchor element 306 is overlapped by visible child elements 308, 310. Thus, performing a hit test using the spatial display properties of element 306 returns element 310. However, prior to discarding element 306, the element finder 110 identifies the parent element of element 310, and identifies element 306 as being the parent of the result of the hit test (tasks 214, 216). Thus, element 306 is retained for future testing even though it is overlapped by another visible element 308, 310.

Referring again to FIG. 2, after identifying the subset of elements on a web page that are actually perceptible to human users, the testing process 200 continues by constructing, creating, or otherwise generating tests that attempt to emulate or otherwise replicate human interaction with the web page based on the perceptible elements identified and then executes or otherwise performs those tests to test the perceptible elements in accordance with the tests (tasks 222, 224). In this regard, the resulting tests only attempt to activate or actuate perceptible elements on the web page, rather than visible elements which cannot be realistically selected by human end users. To generate the tests, the test engine 112 of the testing device 108 retrieves or otherwise obtains test cases 116 corresponding to the type(s) of perceptible elements to be tested and then uses the obtained test cases 116 to create various sequences of activation of those perceptible elements, which are then executed or otherwise performed by the test engine 112 with respect to the web page 103 on the web server 102. The test engine 112 calculates or otherwise determines values for various performance metrics while executing the tests, and stores or otherwise maintains those performance data values 118 in the testing database 114 in association with one or more of the test cases 116, the perceptible elements, the current time associated with the testing and/or the web page 103 being tested to facilitate subsequent analysis of the performance of the web page 103. For example, the mean time to failure for a particular web page 103 may be determined for different time intervals or across different days to facilitate historical analysis of the performance of the web page 103 (e.g., by depicting graphical representations of the mean time to failure with respect to time or instance of testing). Additionally, the test engine 112 may also store or otherwise maintain information pertaining to errors, exceptions, or other bugs encountered during execution of the tests along with recorded execution information that may enable subsequent playback of the tests.

In one or more embodiments, the test engine 112 initiates action of the element finder 110 to identify perceptible elements of a particular type of actionable web page element to be tested, such as, for example, an anchor element, a button element, a form element, or another element that is manipulable, selectable, or otherwise operable by a human user to invoke an action. The test engine 112 may also provide the URL or other identifier of the web page 103 to be tested. Thereafter, the element finder 110 analyzes the identified web page 103 to identify the subset of the actionable elements of the identified type within that web page 103 that are perceptible to human users and provides indication of the perceptible elements of the identified type back to the test engine 112. In some embodiments, the test engine 112 may further filter or otherwise reduce the subset of perceptible elements of the identified type, for example, to reduce the scope of testing or direct the testing in a certain manner. Thus, one or more filtering criteria may be utilized to further limit the testing to particular perceptible elements, such as, for example, to remove hyperlinks associated with help or support functionality or hyperlinks directed to external servers or systems from the subset of perceptible hyperlinks for testing.

Once the final subset of perceptible elements to be tested is identified (alternatively, the testing subset), test engine 112 may utilize the test case(s) 116 for that particular type of actionable element to test the identified elements. For example, the test engine 112 may identify test case(s) 116 associated with hyperlinks and generate and execute tests of the identified subset of perceptible hyperlinks using the test case(s) 116 to verify or validate the functionality of the perceptible hyperlinks.

In one or more exemplary embodiments, the test engine 112 dynamically generates a stress test that attempts to exhaustively test the perceptible elements on a web page 103 in a manner that emulates a human tester. In one embodiment, the test engine 112 generates a breadth first stress test using a hash table with a key corresponding to a perceptible element that has been tested. In this regard, when the hash table is empty, the test engine 112 randomly selects one of the actionable elements in the testing subset as an initially selected element, assigns that element a probability of 1, and configures the test to invoke an action associated with that element. Thereafter, the test engine 112 reinitiates action of the element finder 110 to identify perceptible elements of a particular type of actionable web page element to be tested within the resulting instance of the web page 103 after activation of the initially selected element (i.e., an updated testing subset). The test engine 112 then randomly selects one of the actionable elements in the updated testing subset, and either assigns that element a probability of 1 if it is newly selected or divides its preexisting probability by 2, and then configures the test to invoke an action associated with that element. The test engine 112 may then reinitiate action of the element finder 110 to identify perceptible elements of a particular type of actionable web page element to be tested within the resulting instance of the web page 103 after activation of the subsequently selected element, and so on until encountering an error, exception, bug, or other nonoperative state. The test engine 112 maintains timestamps associated with each element selection or activation, so that a time to failure associated with the particular test can be calculated or otherwise determined. Thereafter, the test engine 112 may create another breadth first stress test using another hash table with a different key corresponding to a different perceptible element from the testing subset, and so on, until each perceptible element of the testing subset initiates a respective stress test. The tests may be executed or otherwise performed until a predefined number of elements have been activated or a predefined amount of time has elapsed without encountering an error since the test was initiated.

Figure 4:
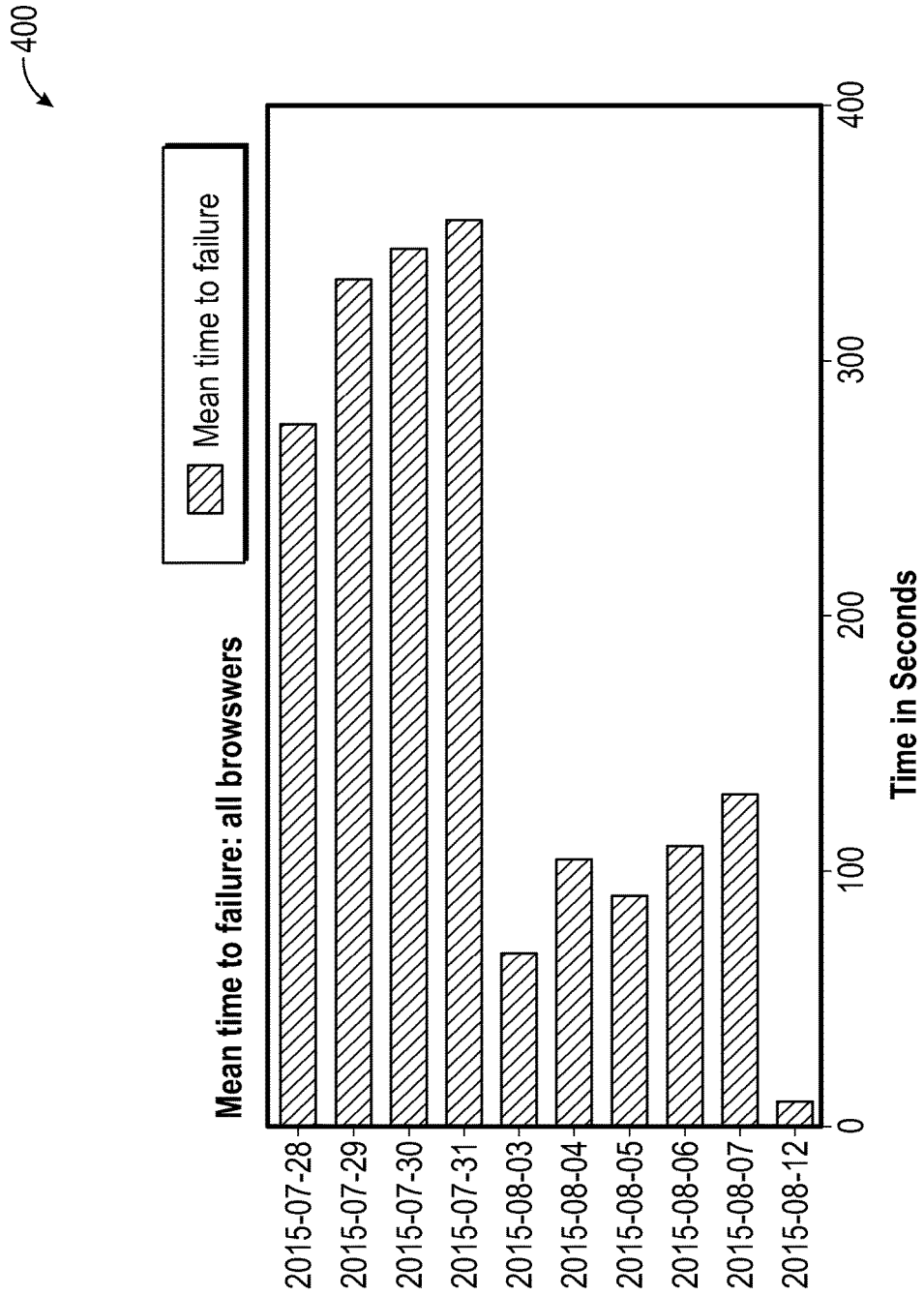
FIG. 4 depicts an exemplary graphical user interface display suitable for presentation on a testing device in conjunction with the testing process of FIG. 2 in accordance with one or more exemplary embodiments.

FIG. 4 depicts an exemplary GUI display 400 that may be presented on the testing device 108 in conjunction with the testing process 200. The GUI display 400 includes graphical representations of the performance metric data values 118 (e.g., mean time to failure) associated with respective instances of the process 200 being performed on a particular web page 103. Thus, the mean time to failure for the web page 103 resulting from stress testing perceptible elements may be determined for different time intervals or across different days to facilitate historical analysis of the performance of the web page 103. A user to correlate changes in performance to particular versions of the web page 103, and based thereon, determining which perceptible elements may have been added, removed, or changed in those versions to identify potential causes of failure or attribute changes in performance to one or more particular perceptible element(s).

Figure 5:
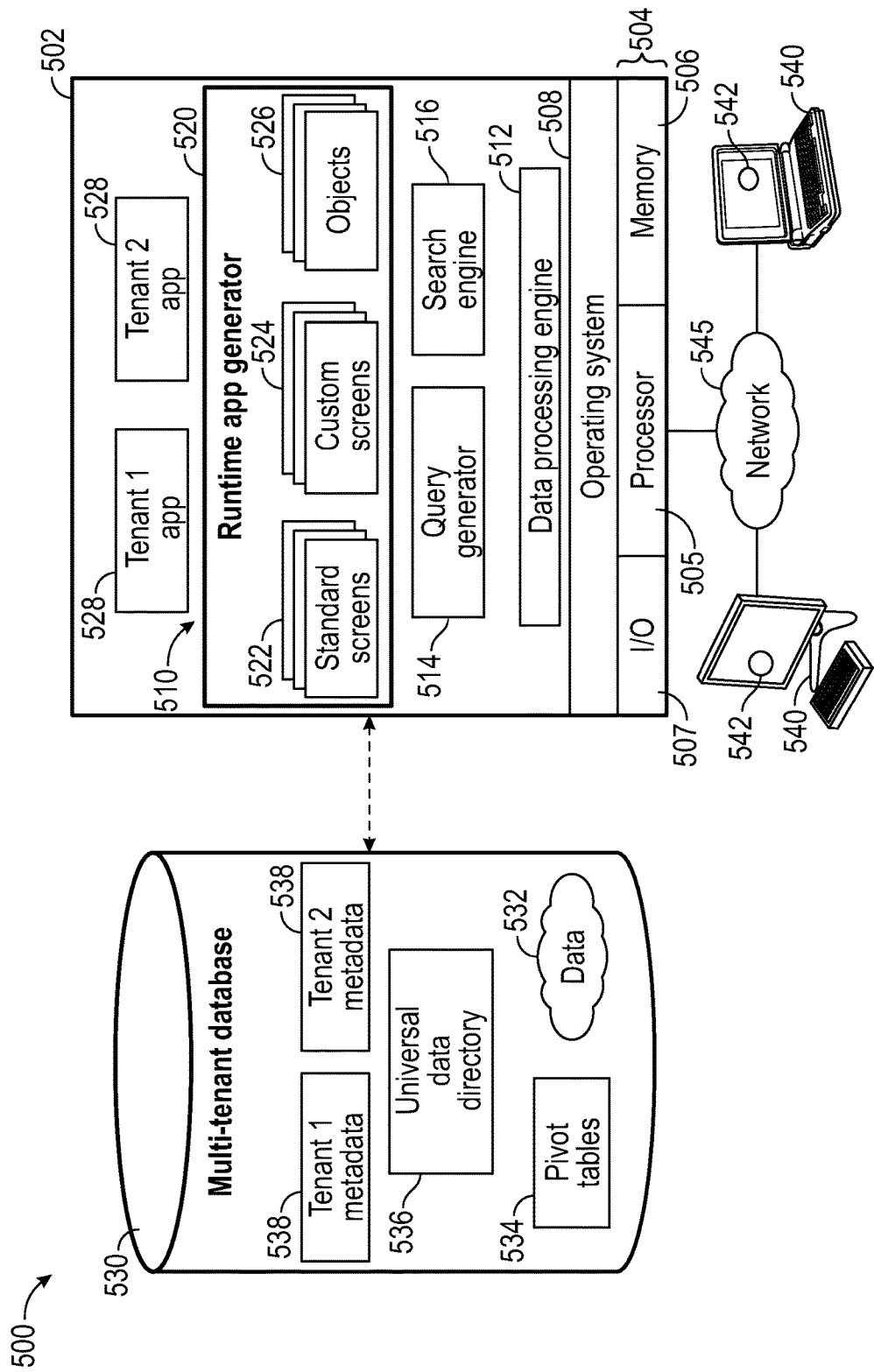
FIG. 5 is a block diagram of an exemplary multi-tenant system suitable for use with the system of FIG. 1 in conjunction with the testing process of FIG. 2 in accordance with one or more embodiments.

FIG. 5 depicts an exemplary embodiment of an on-demand multi-tenant database system 500 suitable for use with the testing process 200 of FIG. 2 in the system 100 of FIG. 1. The illustrated multi-tenant system 500 of FIG. 5 includes a server 502 (e.g., server 102) that dynamically creates and supports virtual applications 528 based upon data 532 from a common database 530 (e.g., database 106) that is shared between multiple tenants, alternatively referred to herein as a multi-tenant database. In this regard, the testing process 200 may be performed to test web pages 103 associated with an instance of a virtual application 528 generated by the server 502 (e.g., server 102) based upon data 532 from database 530 (e.g., database 106). Data and services generated by the virtual applications 528 are provided via a network 545 (e.g., network 104) to any number of client devices 540 (e.g., testing device 108, or the like), as desired. Each virtual application 528 is suitably generated at run-time (or on-demand) using a common application platform 510 that securely provides access to the data 532 in the database 530 for each of the various tenants subscribing to the multi-tenant system 500. In accordance with one non-limiting example, the multi-tenant system 500 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. To put it another way, each respective user within the multi-tenant system 500 is associated with, assigned to, or otherwise belongs to a particular tenant of the plurality of tenants supported by the multi-tenant system 500. Tenants may represent customers, customer departments, business or legal organizations, and/or any other entities that maintain data for particular sets of users within the multi-tenant system 500 (i.e., in the multi-tenant database 530). For example, the application server 502 may be associated with one or more tenants supported by the multi-tenant system 500. Although multiple tenants may share access to the server 502 and the database 530, the particular data and services provided from the server 502 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528. The multi-tenant database 530 may alternatively be referred to herein as an on-demand database, in that the multi-tenant database 530 provides (or is available to provide) data at run-time to on-demand virtual applications 528 generated by the application platform 510.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or application platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request. In this manner, the query generator 514 suitably obtains requested subsets of data 532 accessible to a user and/or tenant from the database 530 as needed to populate the tables, reports or other features of the particular virtual application 528 for that user and/or tenant.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 526 such as "account" objects, "opportunity" objects, "contact" objects, or the like. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530. Typically, the user operates a conventional browser application or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to functional testing, verification testing, stress testing, test generation, document object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of testing graphical elements associated with a web page file available over a communications network, the method comprising:
    identifying, by a computing device coupled to the communications network, a visible subset comprising an initial set of actionable graphical web page elements within a graphical user interface associated with the web page file;
    identifying, by the computing device, a testable subset of the initial set of actionable web page elements, the testable subset of the actionable web page elements being perceptible to a human user, wherein identifying the testable subset comprises, for each actionable graphical web page element of the initial set:
        obtaining spatial display properties of the respective actionable graphical web page element;
        performing a hit test for the respective actionable graphical web page element using the spatial display properties; and retaining the respective actionable graphical web page element in the testable subset when a result of the hit test corresponds to the respective actionable graphical web page element;

generating, by the computing device, one or more tests for the web page file based on the testable subset of the actionable graphical web page elements; and performing, by the computing device, the one or more tests on the web page file using the communications network.

2. The method of claim 1, wherein identifying the visible subset comprises identifying the initial set of actionable graphical web page elements having a visibility attribute value indicating each actionable graphical web page element of the initial set is visible.

3. The method of claim 1, wherein:

identifying the visible subset comprises identifying the initial set of actionable graphical web page elements from among the graphical elements within the graphical user interface based on a visibility attribute and an element type associated with the respective actionable graphical web page elements, wherein the visibility attribute associated with each actionable graphical web page element of the initial set indicates the respective actionable graphical web page element is visible; and identifying the testable subset comprises identifying a second subset of the initial set, wherein each actionable graphical web page element of the second subset is perceptible to a human user or a parent of a perceptible child element.

4. The method of claim 1, the web page file comprising a web page available from a server coupled to the communications network, wherein:

identifying the visible subset comprises identifying a first subset of actionable graphical elements within the graphical user interface associated with the web page; and identifying the testable subset comprises identifying a second subset of the first subset, wherein the second subset comprises actionable graphical elements perceptible within the graphical user interface.

5. The method of claim 1, further comprising:

determining, by the computing device, one or more performance metric values associated with the one or more tests based on the performing; and storing, by the computing device, the one or more performance metric values in association with the one or more tests in a database.

6. A computer-readable medium having instructions stored thereon that are executable by a processing system of the computing device to perform the method of claim 1.

7. The method of claim 1, wherein performing the hit test comprises verifying the respective actionable graphical web page element is a hit test result at one or more locations within a display area of the graphical user interface associated with the web page file, wherein the spatial display properties indicate the respective actionable graphical web page element encompasses the one or more locations.

8. The method of claim 1, further comprising designating the respective actionable graphical web page element as a testable element when a result of performing the hit test corresponds to a child of the respective actionable graphical web page element.

9. The method of claim 2, wherein identifying the testable subset comprises identifying a second subset of the initial set of actionable graphical web page elements, wherein each actionable graphical web page element of the second subset comprises a testable element perceptible to a human user.

10. The method of claim 2, wherein identifying the testable subset comprises excluding one or more actionable graphical web page elements of the initial set, wherein the one or more actionable graphical web page elements are not perceptible to a human user.

11. The method of claim 4, wherein the server generates the web page associated with a virtual application generated by the server based at least in part on data from a database coupled to the server.

12. The method of claim 5, wherein generating the one or more tests comprises probabilistically determining an activation sequence involving one or more graphical elements of the testable subset.

13. A testing system comprising:

a database to store one or more tests for actionable graphical web page elements associated with a file type; and a computing device coupled to the database to identify a visible subset of actionable graphical web page elements within a graphical user interface associated with a web page file having the file type, identify a testable subset of the visible subset of actionable graphical web page elements based on perceptibility of the actionable graphical web page elements of the testable subset, generate one or more test cases for the web page file based on the one or more tests and the testable subset of actionable graphical web page elements, perform the one or more tests on the web page file using a communications network, and store results of performing the one or more tests in the database, wherein identifying the testable subset comprises, for each actionable graphical web page element of the visible subset:

obtaining spatial display properties of the respective actionable graphical web page element;

performing a hit test for the respective actionable graphical web page element using the spatial display properties; and retaining the respective actionable graphical web page element in the testable subset when a result of the hit test corresponds to the respective actionable graphical web page element.

14. The system of claim 13, wherein the computing device is coupled to a server over the communications network, the server hosting the web page file, wherein the computing device performs the one or more tests on the web page file hosted by the server via the communications network.

15. The system of claim 13, wherein each actionable graphical web page element of the visible subset has a visibility attribute value indicating visibility.

16. The system of claim 14, wherein the web page file comprises a web page associated with a virtual application generated by the server based at least in part on data from a second database coupled to the server.

* * * * *